United States Patent

Boury et al.

Patent Number: 5,326,728
Date of Patent: Jul. 5, 1994

[54] LEAD-FREE ENAMEL COMPOSITIONS FOR THE DECORATION OF LOW-EXPANSION GLASS-CERAMICS

[75] Inventors: Gerard R. M. Boury, Darvault; Daniel L. G. Ricoult, Palaiseau, both of France

[73] Assignee: Corning Incorporated, Corning, N.Y.

[21] Appl. No.: 134,664

[22] Filed: Oct. 12, 1993

[30] Foreign Application Priority Data

Feb. 12, 1993 [FR] France .................. 93 01611

[51] Int. Cl.$^5$ .................. C03C 8/16; C03C 8/14; C03C 8/02
[52] U.S. Cl. .................. 501/17; 501/21; 501/32; 501/20; 501/14; 501/66; 501/67; 501/69; 501/70; 501/77
[58] Field of Search .................. 428/427, 428, 542.4; 501/32, 21, 17, 20, 14, 66, 67, 69, 70, 77

[56] References Cited

U.S. PATENT DOCUMENTS 4,256,497  3/1981  Knapp ................ 501/21
4,361,654  11/1982  Ohmura et al. ........ 501/21
4,446,241  5/1984  Francu et al. ........ 501/14
4,507,392  3/1985  Rittler ............... 501/21
4,814,298  3/1989  Nelson et al. ........ 501/21

Primary Examiner—Karl Group
Assistant Examiner—C. M. Bonner
Attorney, Agent, or Firm—C. S. Janes, Jr.

[57] ABSTRACT

This invention is directed to the production of lead-free enamels containing finely-divided glass particles, finely-divided pigment particles, and an organic binder wherein the glass particles consist essentially, expressed in terms of weight percent on the oxide basis, of

| | | | |
|---|---|---|---|
| $SiO_2$ | 35-50 | $Li_2O + Na_2O + K_2O$ | <8 |
| $B_2O_3$ | 23-30 | CaO | 1-5 |
| $Al_2O_3$ | 10-22 | $CaO + MgO + ZnO + BaO + SrO$ | <7 |
| $Li_2O$ | 1-3 | $TiO_2$ | 0-2 |
| $Na_2O$ | 0-3 | $ZrO_2$ | 0-5 |
| $K_2O$ | 2-5 | | | said glass having a softening temperature $T_L$ above 650° C. and thermal expansion coefficient below $60 \times 10^{-7}$/°C. Among other applications, said glass can be used for the decoration of low-expansion glass-ceramic cooking plates.

5 Claims, No Drawings

LEAD-FREE ENAMEL COMPOSITIONS FOR THE DECORATION OF LOW-EXPANSION GLASS-CERAMICS

The invention relates to enamel compositions for decorating glass-ceramic articles with little or no expansion, and particularly cooking plates.

The majority of commercial glass-ceramic cooking plates are decorated with different colored enamels. This decoration satisfies, on one hand, aesthetic criteria, involving a great variety of colors and patterns. On the other hand, a safety objective is attained by emphasizing with these decorations the position of the zones of heating which, during functioning of the cooking plate, can reach high temperatures.

The production of enamels is normally done in several steps. First, a glass is melted according to the conventional techniques of the glassmaking industry. This glass is then crushed to a grain size that is compatible with the later application of the enamel by silk-screening. To the powder thus obtained are added pigments which give the enamel its color and opaqueness. This powdered mixture is finally incorporated into an organic binder in proportions which are suited to the desired viscosity of the resulting paste. The enamel is thus ready for use. It is applied to the substrate by a direct silk screen process, by a transfer process, or by any other process, and then dried and fired using an appropriate heat treatment, typically including a plateau at a temperature above 900° C.

Besides the two functions mentioned in the preceding, these decorations must meet physicochemical specifications resulting from the conditions of use of glass-ceramic cooking plates. For example, the decorations must be able to resist corrosion by acids and bases; they must undergo repeated thermal shocks without scaling; they must be easy to clean, even after calcination of food residues; and they must have a good resistance to abrasion. Furthermore, the viscosity of the glass constituting the enamel must be sufficiently low at the coating temperature, so as not to affect the characteristics of the glass-ceramic substrate. Traditionally, the introduction of lead oxide in the glass composition constituting the enamel greatly lowers its viscosity and thus guarantees a proper coating, that is to say, proper wetting and proper covering of the glass-ceramic by the enamel. Nevertheless, in view of the current tendency to eliminate toxic elements from products for cooking use, we consider that the enamels used for the decoration of glass-ceramic cooking plates should be free of such elements and, in particular, free of heavy metals such as lead. Finally, the linear coefficient of thermal expansion of the enamel must not be too high, so as to be compatible with the glass-ceramic substrate which, normally consisting of microcrystals of $\beta$-quartz or $\beta$-spodumene, has a low or zero expansion coefficient. In effect, an excessive difference in thermal expansion between the substrate and the enamel would cause scaling of the latter in thermal cycles during use.

The object of the invention is to provide an enamel composition that is free of lead or other toxic metals and can be used for decoration of glass-ceramic articles, in particular, of cooking plates, with little or no expansion.

More precisely, the invention relates to an enamel composition without lead, which contains finely-divided glass particles, finely-divided pigment particles, and an organic binder, characterized by the fact that the glass has a linear coefficient of thermal expansion less than or equal to $60 \times 10^{-7}$/K, and preferably $55 \times 10^{-7}$/K, and consists essentially, expressed in terms of weight percent based on the oxides, of:

| | |
|---|---|
| $SiO_2$ | 35–50 |
| $B_2O_3$ | 23–30 |
| $Al_2O_3$ | 10–22 |
| $Li_2O$ | 1–3 |
| $Na_2O$ | 0–3 |
| $K_2O$ | 2–5 |
| $Li_2O + Na_2O + K_2O$ | <8 |
| $CaO$ | 1–5 |
| $CaO + MgO + ZnO + BaO + SrO$ | <7 |
| $TiO_2$ | 0–2 |
| $ZrO_2$ | 0–5, | said glass having a softening temperature $T_L$ above 650° C.

Preferably, the glass composition, in weight percent based on the oxides, consists essentially of:

| | |
|---|---|
| $SiO_2$ | 35–50 |
| $B_2O_3$ | 23–28 |
| $Al_2O_3$ | 13–20 |
| $Li_2O$ | 1.5–2.5 |
| $Na_2O$ | 0.5–2.0 |
| $K_2O$ | 2–5 |
| $Li_2O + Na_2O + K_2O$ | <8 |
| $CaO$ | 2–4 |
| $MgO$ | 0–1 |
| $ZnO$ | 0–1 |
| $BaO$ | 0–3 |
| $SrO$ | 0–1 |
| $TiO_2$ | 0–2 |
| $ZrO_2$ | 0–4 |

Also preferably, the softening temperature $T_L$ of the glass is above 680° C.

The enamel compositions of the invention have viscosity properties such that proper coating of the enamel on a glass-ceramic article to be decorated can be obtained at temperatures of 900°–1000° C.

The enamels obtained from the compositions of the invention have a good resistance to mechanical stresses, such as abrasion, and to the temperature of use of the cooking plate, which is typically on the order of 600°–640° C., in part from the fact that the glass constituent of these compositions has a softening temperature $T_L$ (viscosity of $10^{6.6}$ Pa.sec) above 650° C., and preferably above 680° C.

Moreover, the enamels manufactured from the compositions of the present invention have good characteristics of chemical durability, ability to be cleaned, and resistance to thermal shocks.

The ranges defined above for each of the components of the glass are critical for obtaining the desired properties.

Silica is a conventional component of glasses, and it plays a predominant role in properties, such as the hardness of the glass and the chemical durability.

$Al_2O_3$ must be kept at a concentration above 10% in order to obtain a hard enamel and a softening temperature above 650° C. Moreover, alumina increases the microhardness of the enamel and therefore its resistance to scratching. Above 22% $Al_2O_3$, the viscosity becomes too high to allow for correct coating of the enamel.

$B_2O_3$ is an essential constituent of the enamel, since it allows one to lower the viscosity of the enamel and therefore to guarantee proper coating on the glass-ceramic substrate, while not causing an exaggerated increase of the expansion coefficient. The quality of coating directly influences the facility of cleaning of the enamel, which is better in case of smooth surfaces. This oxide also improves the resistance to abrasion of the enamel. Its concentration must be higher than 23%, but must not exceed 30%, so as to avoid the appearance of undesirable iridescence around the elements of the decoration after firing thereof.

$ZrO_2$ has the essential effect of hardening the enamel. It also plays a very positive role in the chemical durability and does not increase the expansion of the glass. Its concentration must not, however, exceed 5%, above which threshold it becomes difficult to melt the glass without unmelted solid inclusions.

Used individually or in combinations, $Li_2O$, $Na_2O$, and $K_2O$ facilitate the melting of the glass and lower the viscosity of the resulting enamel, thus promoting its coating on the underlying glass-ceramic. In contrast, their individual concentrations must be lower than 3%, 3% and 5%, respectively, and their total concentration less than 8% in order to keep a coefficient of thermal expansion for the enamel which is compatible with that of the glass-ceramic, that is to say, less than or equal to $60 \times 10^{-7}/K$, preferably $55 \times 10^{-7}/K$, and a softening temperature above 650° C., and preferably above 680° C. Excessive contents of these alkali metal oxides result in tensions at the interface between the glass-ceramic and the enamel, which can be exhibited as scaling of the latter in thermal cycles during use. On the other hand, the concentrations of alkali metal oxides must be sufficiently low in order to not deteriorate the resistance to scratching of the enamel and to keep for it a good chemical durability, in particular with regard to acids.

CaO is present in order to improve the chemical durability of the glass. It also plays a positive role in the coating of the enamel and will consequently be used in a small amount (not higher than 5%), but at least 1%. This oxide can be partially substituted by ZnO, BaO, SrO, and MgO, which improve the resistance to abrasion of the enamel.

For obtaining an enamel, a charge of pigments is normally added to the glass within the claimed composition range, after it is crushed. When a white enamel is desired, the use of titanium or cerium oxides as pigment is the usual practice. The use of the first is nevertheless preferred for obtaining very white and opaque enamels, as well as for guaranteeing a good resistance to abrasion for the enamel. Other oxides, such as those of iron, chromium, cobalt, manganese, alone, in mixtures, or added to the cerium or titanium oxides, can be used to obtain colored enamels.

The level of addition in weight percent of pigments added to the base glass is typically on the order of 10–40%, depending on the desired color and opaqueness.

The grain size of the pigment or pigments incorporated in the composition is a critical parameter in order to guarantee a good resistance to abrasion for the final enamel. It has been found that the average particle size of the pigment or pigments must be less than 2 μm, and preferably less than or equal to 1 μm, in order to avoid any removal of the pigment particles out of the vitreous phase.

The invention also relates to the enamels obtained from the compositions of the invention by firing of these compositions, and to the glass-ceramic articles decorated with these compositions, and particularly to cooking plates.

The glass-ceramics with low or zero thermal expansion are well known in themselves and are the object of numerous patents. A preferred class of such glass-ceramics is that described in U.S. Pat. No. 5,070,045. They are typically composed of microcrystals of β-quartz or β-spodumene and a vitreous matrix.

The following experimental procedures were followed for the studies which resulted in the present invention.

Glasses are melted at 1550° C. At the end of the melting cycle, or typically after 4 hours at the aforementioned temperature, a part of the glass is poured into water in order to form a fritted material and then dried in the oven, while the remaining part is cast in the form of a plate, in order to permit the characterization of the glass.

The fritted material formed is in the form of small, irregularly shaped fragments which are crushed and sieved in several steps, until a sufficiently fine average grain size (on the order of 4–5 μm), suitable for later application of the enamel composition is obtained. The crushing is effected with the aid of alumina ball mills, dry or in an alcohol medium, or else attrition mills in alcohol medium. The powder collected is then dried and subjected to controlled granulometry.

At this stage the pigments are added and mixed with the glass powder obtained above. The nature and quantity of these pigments depend on the desired color for the final enamel, as is obvious to the expert in the field. The weight fractions of pigments added to the base glass can reach or exceed 40%. The properties reported in Table I were obtained with enamels containing 30% titanium oxide.

The last step in the fabrication of the enamel consists of incorporating an organic binder into the powdered mixture of the glass and pigments. Any type of organic binder conventionally used in enamel compositions can be used and particularly binders based on pine oil, with contents varying typically between 30 and 50% by weight. The proportion of binder determines the viscosity of the paste and allows one to adjust the thickness of the enamel after firing. In the case of decorations for glass-ceramic cooking plates, the thickness of the enamel in principle does not exceed 5–6 μm.

In the given examples, the deposition of enamel on the glass-ceramic substrate was done by direct silk screen process, but one could also have recourse to a decalcomania process or any other process.

The firing of the enamel is then carried out according to a heat treatment which comprises a plateau at a maximum temperature of 925° C. for 20 min. After this firing, the enamel elements have a thickness typically on the order of 3–5 μm.

The coefficient of thermal expansion is measured with the aid of a differential dilatometer between room temperature and 300° C. The softening temperature of the base glass of the enamel is measured by a fiber drawing technique conventional in the glassmaking field.

Besides the softening temperature, the coating ability of the enamel is also quantified by the test called the "button" test. A disk of powdered enamel is cold pressed, placed on a glass-ceramic plate, then subjected to the firing described above. The ratio (R) of its height before and after firing is a good indicator of its ability to be spread on the substrate. The coating is much better as R is greater than 1.

The resistance to abrasion was measured with the aid of three tests representative of the conditions of use of the glass-ceramic cooking plates, namely sliding movement of pans or plates on the surface, or else cleaning with abrasive pads. The first test (A) consists of sliding alternately and in one direction over the enameled regions of a glass-ceramic plate, a cylindrical metallic mass 7 cm in diameter and weighing 360 g, having a flat base and coated with an abrasive paper of grain size 240. 500 back-and-forth and-forth movements of the cylinder are carried out with the abrasive paper being changed after 250 translational movements. In the second test (B), the enameled sample is subjected to an alternating horizontal translational movement on a commercial abrasive pad commonly used for maintaining cooking utensils, which is itself placed on a support rotating at approximately 60 rpm. The sample to be tested is pressed on the abrasive pad with a pressure on the order of 1.5 bar. The test lasts 4 minutes. While the first two abrasion tests are carried out dry, the third (C) is conducted in the presence of water, which makes it more severe than the first two tests. The device and the conditions of test B are used. In the three cases, the enamels are classified on an arbitrary scale according to a visual evaluation: 1, no change in appearance of the enamel; 2, appearance of a zone of contrast, indicating the beginning of abrasion; 3, localized disappearance of the enamel; 4, extensive disappearance of the enamel; 5, complete disappearance of the enamel.

The ability for the enamel to be cleaned and to be stained are evaluated in the following way. A mixture of minced meat, egg, milk, sugar, flour, gruyere, tapioca, and tomato concentrate is placed for 10 min between a pan filled with water and the enameled zone of the cooking plate being heated. This mixture burned and stuck to the plate is then more or less easy to clean. After five repetitions of this procedure, several levels of cleaning ability are then defined, between 1, for complete cleaning, and 3, for extensive presence of cooking residues that cannot be cleaned. The cleanability is an inverse function of the roughness of the surface of the enamel.

Table I presents a group of glass compositions without lead permitting the manufacture of enamels with coefficients of thermal expansion less than or equal to $55 \times 10^{-7}/K$ for decoration of glass-ceramics with low or zero expansion, having viscosity characteristics permitting the melting of the base glass and coating of the enamel, as well as a good chemical durability and good resistance to abrasion. These compositions are expressed in terms of weight percent on the basis of the oxides and illustrate various aspects of the composition of the present invention. It is to be noted that the glasses can be melted from the usual batch materials in the form of oxides or other compounds, which by decomposition are transformed into oxides in the desired proportions. For example, lithium carbonate and sodium nitrate can be used as sources of lithium and sodium oxides, respectively.

The properties reported in Table I were measured on enamels obtained under the experimental conditions described above, in particular with enamels containing 30% titanium oxide as filler/pigment and 50% organic binder based on pine oil.

The characteristics of the examples of Table I are summarized hereafter. Examples 1-5 allow one to obtain glasses having properties such that they can serve for the manufacturing of enamels for the decoration of glass-ceramics with low or zero coefficient of thermal expansion; Examples 1 and 2 constitute preferred compositions. The comparison of Example 2 with Example 3 emphasizes the effect of an increase of sodium oxide, which leads to an increase of thermal expansion and a decrease of the softening temperature. Likewise, the reduction of lithium oxide, such as is shown in Example 4, leads to a reduction of the coefficient of thermal expansion and an increase of the softening temperature. Finally, the reduction of alumina from Example 2 to Example 5 results in a decrease of the softening temperature, but also of the hardness of the enamel. The composition of Example 1 also contains less alumina, but, in the absence of zirconia, the relatively high concentration of $SiO_2$ does not permit the softening temperature and the hardness to decrease.

Although no results are reported here, the enamels of the invention exhibit a good resistance to acid and base attack, according to the tests ISO 2742 and ISO 2745.

It goes without saying that the embodiments described are only examples and that they could be modified, particularly by substitution of technical equivalents, without consequently departing from the scope of the invention.

TABLE I

| EXAMPLES | 1 | 2 | 3 | 4 | 5 |
|---|---|---|---|---|---|
| $SiO_2$ | 49.8 | 42.9 | 41.2 | 43.2 | 45.3 |
| $Al_2O_3$ | 13.0 | 18.5 | 18.0 | 18.0 | 15.0 |
| $B_2O_3$ | 27.5 | 27.0 | 28.0 | 28.0 | 28.0 |
| $Na_2O$ | 1.0 | 0.9 | 2.0 | 0.9 | 0.9 |
| $K_2O$ | 3.8 | 3.4 | 3.5 | 3.5 | 3.5 |
| $Li_2O$ | 2.2 | 2.1 | 2.1 | 1.2 | 2.1 |
| CaO | 2.7 | 2.7 | 2.7 | 2.7 | 2.7 |
| $ZrO_2$ | — | 2.5 | 2.5 | 2.5 | 2.5 |
| Coefficient of Thermal Expansion ($\times 10^7 K^{-1}$) | 50 | 53 | 55 | 49 | 55 |
| $T_L$ (deg. C.) | 685 | 700 | 684 | 729 | 681 |
| R (coating) | 1.10 | 1.30 | 1.26 | 1.06 | 1.34 |
| Hardness (N/mm²) | 4300 | 4400 | — | 4500 | 4100 |
| Abrasion | | | | | |
| "A" | 1 | 1 | 1 | 2 | 2 |
| "B" | 1 | 1 | 1 | 1 | 1 |
| "C" | 1 | 1 | 1 | 3 | 3 |
| Durability | 1 | 1 | — | — | — |

We claim:

1. A lead-free enamel composition containing finely divided glass particles, finely divided pigment particles, and an organic binder, characterized in that the glass exhibits a coefficient of thermal expansion less than or equal to $60 \times 10^{-7}/K$ and a softening temperature $T_L$ above 650° C., and consists essentially, expressed in weight percent based on the oxides, of

| | | | |
|---|---|---|---|
| $SiO_2$ | 35-50 | $Li_2O + Na_2O + K_2O$ | <8 |
| $B_2O_3$ | 23-30 | CaO | 1-5 |
| $Al_2O_3$ | 10-22 | $CaO + MgO + ZnO + BaO + SrO$ | <7 |
| $Li_2O$ | 1-3 | $TiO_2$ | 0-2 |
| $Na_2O$ | 0-3 | $ZrO_2$ | 0-5. |
| $K_2O$ | 2-5 | | |

2. An enamel composition according to claim 1, characterized in that said glass has a softening temperature $T_L$ above 680° C.

3. An enamel composition according to claim 1, characterized in that the composition of the glass consists essentially of

| | | | | | |
|---|---|---|---|---|---|
| SiO$_2$ | 35–50 | K$_2$O | 2–5 | BaO | 0–3 |
| B$_2$O$_3$ | 23–28 | Li$_2$O + Na$_2$O + K$_2$O | <8 | SrO | 0–1 |
| Al$_2$O$_3$ | 13–20 | CaO | 2–4 | TiO$_2$ | 0–2 |
| Li$_2$O | 1.5–2.5 | MgO | 0–1 | ZrO$_2$ | 0–4. |
| Na$_2$O | 0.5–2.0 | ZnO | 0–1 | | |

4. An enamel composition according to claim 2 characterized in that the composition consists essentially of

| | | | | | |
|---|---|---|---|---|---|
| SiO$_2$ | 35–50 | K$_2$O | 2–5 | BaO | 0–3 |
| B$_2$O$_3$ | 23–28 | Li$_2$O + Na$_2$O + K$_2$O | <8 | SrO | 0–1 |
| Al$_2$O$_3$ | 13–20 | CaO | 2–4 | TiO$_2$ | 0–2 |
| Li$_2$O | 1.5–2.5 | MgO | 0–1 | ZrO$_2$ | 0–4. |
| Na$_2$O | 0.5–2.0 | ZnO | 0–1 | | |

5. An enamel composition according to claim 1, characterized in that the glass has a coefficient of thermal expansion less than or equal to $55 \times 10^{-7}/K$.

* * * * *